March 27, 1928.
M. S. WAGNER
SCARF
Filed March 2, 1927
1,663,893
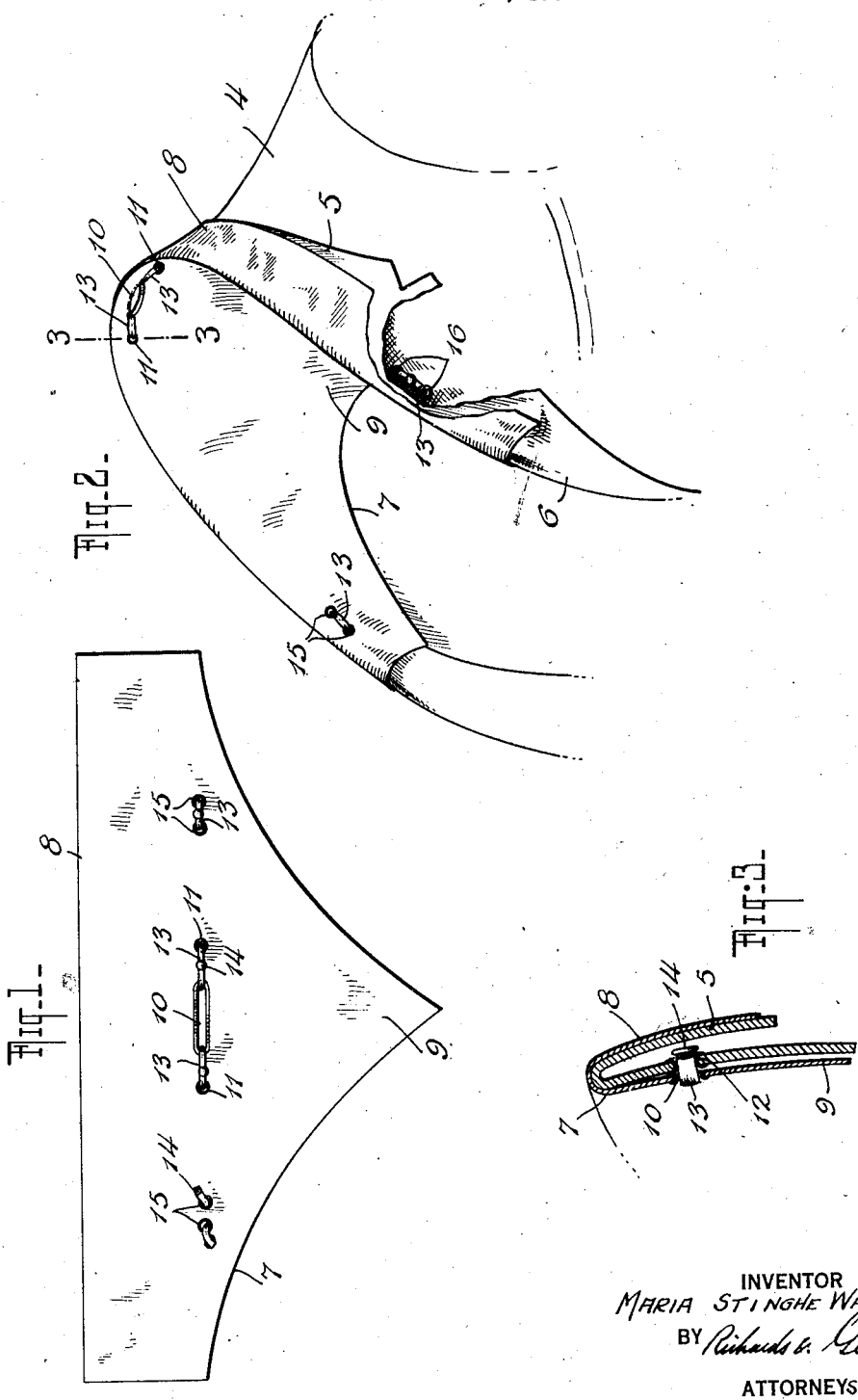
INVENTOR
MARIA STINGHE WAGNER
BY
ATTORNEYS Patented Mar. 27, 1928.

1,663,893

UNITED STATES PATENT OFFICE.

MARIA STINGHE WAGNER, OF NEW YORK, N. Y.

SCARF.

Application filed March 2, 1927. Serial No. 172,022.

This invention relates to improvements in scarfs, and has for one of its objects to provide a scarf which may be detachably connected to the collar of a suit or overcoat to afford protection to the shirt collar and which presents a neat and attractive appearance when in use.

The above and other objects will appear more clearly from the following detail description, when taken in connection with the accompanying drawing, which illustrates a preferred embodiment of the inventive idea.

In the drawing—

Figure 1 is a plan view of the scarf constructed in accordance with the invention;

Figure 2 is a fragmentary perspective view of a coat showing the scarf in position thereon; and Figure 3 is a fragmentary sectional view of the coat collar and scarf.

The present invention is applicable alike to both suit coats and overcoats of ordinary construction and in the drawing there is illustrated a coat 4 having the usual collar 5 and lapels 6.

The scarf 7 may be made of any suitable material such as satin or the like and is preferably of a different color from that of the garment to which it is attached. The scarf is made from a single piece of the material, either of single or double thickness and is cut to a length sufficient for the collar portion 8 thereof to extend around the exterior of and cover the collar 5 and a portion of the lapels 6, as shown in Figure 2. At the center of its length the scarf has its greatest width, this being due to the formation of a tapered tail-piece 9 which, when the scarf is in position, is arranged on the interior side of the coat covering that portion thereof adjacent the collar 5 and directly below the same.

At its center, the scarf is provided with a longitudinally extending slot or opening 10 through which the hook of a hanger may be projected when supporting the coat on the hanger, said slot being disposed on the inner side of the coat collar and just beneath the upper edge thereof when the scarf is in position. To attach the central portion of the scarf to the coat, there is provided at each end of the slot 10, an eyelet 11 and formed in the material of the coat beneath the collar 5 are two spaced pairs of eyelets 12 with an eyelet of each pair adapted to be alined with one end of the slot 10 and the remaining eyelets of said pairs with the adjacent eyelets 11. Flexible securing strips 13 are then extended through the slot 10 and alined eyelets 11 and 12 and are provided with separable fasteners 14 which may be connected to form a loop and thereby detachably secure the scarf to the coat.

In alignment with the slot 10 and approximately midway between the same and the ends of the scarf the latter is provided with pairs of eyelets 15 similar to the eyelets 11 and which eyelets 15 are adapted to be registered or alined with similar eyelets 16 formed in the material of the coat in that portion thereof adjacent each end of the collar 5 where the lapels 6 join the same. Securing strips similar to the strips 13 are then looped through the alined eyelets and have their ends secured together to attach the adjacent portions of the scarf to the garment and thereby prevent undue shifting of the scarf.

Depending upon the size of the scarf and the length of the tail-piece 9 the latter may or may not be provided with eyelets adjacent the extremity thereof which may be aligned with eyelets in the lining of the coat for the reception of strips, such as 13, for attaching the lower extremity of the scarf in position.

What is claimed is:

A scarf for coats including an inner portion and a collar portion adapted to extend around and overlap the exterior of the collar of a coat and parts of the lapels thereof, said inner portion having at its center an elongated slot for the reception of the hook of a coat hanger and also having an eyelet adjacent each end of the slot, said eyelets and the ends of said slot being adapted to align with eyelets formed in the coat beneath the collar thereof, other eyelets formed in the scarf between said slot and each end of the scarf and adapted for alignment with eyelets formed in the coat beneath the lapels thereof, securing strips looped through the ends of said slot and adjacent eyelets and through the aligned eyelets in the coat, and other securing strips looped through said other eyelets and the aligned eyelets in the coat beneath its lapels to secure the end portions of the scarf to the coat, said securing strips all being disposed beneath said collar portion.

In testimony whereof I have affixed my signature.

MARIA STINGHE WAGNER.